(12) United States Patent
Brown et al.

(10) Patent No.: US 9,635,031 B2
(45) Date of Patent: *Apr. 25, 2017

(54) IDENTIFYING FRAUDULENT ACTIVITIES AND THE PERPETRATORS THEREOF

(71) Applicant: Paypal, Inc., San Jose, CA (US)

(72) Inventors: Andrew Millard Brown, Mountain View, CA (US); Mathew Gene Henley, Campbell, CA (US); Chris Lalonde, Campbell, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/622,900

(22) Filed: Feb. 15, 2015

(65) Prior Publication Data

US 2015/0172295 A1 Jun. 18, 2015

Related U.S. Application Data

(63) Continuation of application No. 12/542,527, filed on Aug. 17, 2009, now Pat. No. 8,959,637, which is a continuation of application No. 11/027,783, filed on Dec. 30, 2004, now Pat. No. 7,581,112.

(51) Int. Cl.
*H04L 29/06* (2006.01)
*G06F 21/55* (2013.01)

(52) U.S. Cl.
CPC .......... *H04L 63/102* (2013.01); *G06F 21/552* (2013.01); *H04L 63/10* (2013.01); *H04L 63/1408* (2013.01); *H04L 2463/102* (2013.01)

(58) Field of Classification Search
CPC ....... H04L 63/10; H04L 63/102; H04L 63/14; H04L 63/1408; H04L 63/1425; H04L 2463/102; G06F 21/55; G06F 21/552; G06F 21/554
See application file for complete search history.

(56) References Cited

U.S. PATENT DOCUMENTS

| | | | | |
|---|---|---|---|---|
| 2002/0144156 A1* | 10/2002 | Copeland, III | ....... | H04L 43/026 726/22 |
| 2009/0034521 A1* | 2/2009 | Kato | ....................... | G06F 21/31 370/389 |

OTHER PUBLICATIONS

Denning, An Intrusion-Detection Model, IEEE, 1987.*

* cited by examiner

*Primary Examiner* — Minh Dinh
(74) *Attorney, Agent, or Firm* — Maschoff Brennan

(57) ABSTRACT

Systems and methods are disclosed herein to identify fraudulent activity. In one embodiment, a method for identifying fraudulent activity includes receiving and extracting, at a server comprising at least one hardware-based processor and a memory coupled to the at least one hardware-based processor, header information from each of a plurality of client communications issued by one or more client devices. An account is identified that is associated with each of the plurality of client communications. Header information is analyzed from each of the plurality of client communications to identify variations between the header information from different ones of the client communications. In various embodiments, a determination is made as to whether there is a similarity of the client communications and at least one previous communications associated with the account. Other systems and methods are also disclosed.

19 Claims, 6 Drawing Sheets

HEADER "FINGERPRINT" 42

| HEADER NAME | HEADER VALUE |
|---|---|
| Connection | Keep-Alive |
| User-Agent | Mozilla/4.05 [en] (WinNt; I) |
| Host | www.merchant.com |
| Accept | Image/gif, image/x-xbitmap, image/jpeg |
| Accept-Language | en |
| Accept Charset | Iso-8859-1,*,utf-8 |
| Cookie | searchString=java servlet cookies |
| X-Forwarded-For | 214.8.6.100 |

FIG. 3

IDENTIFYING FRAUDULENT ACTIVITIES AND THE PERPETRATORS THEREOF

CROSS-REFERENCE TO RELATED APPLICATIONS

This application is a continuation of U.S. patent application Ser. No. 12/542,527, filed Aug. 17, 2009, and entitled "IDENTIFYING FRAUDULENT ACTIVITIES AND THE PERPETRATORS THEREOF" (issued as U.S. Pat. No. 8,959,637 on Aug. 25, 2009, which is a continuation of U.S. patent application Ser. No. 11/027,783 (issued as U.S. Pat. No. 7,581,112 on Aug. 25, 2009), filed Dec. 30, 2004, entitled "IDENTIFYING FRAUDULENT ACTIVITIES AND THE PERPETRATORS THEREOF," both of which are incorporated herein by reference in their entireties.

TECHNICAL FIELD

Exemplary embodiments of the present invention relate generally to the field of online fraud prevention and, in one exemplary embodiment, to methods and systems for identifying fraudulent activities and the perpetrators of such activities.

BACKGROUND

The number of people purchasing products (e.g., goods and/or services) and executing financial transactions via the Internet has increased significantly over the course of the last several years. Many online enterprises have managed to attract and retain large customer bases resulting in significant growth and financial success. However, many successful online enterprises have not only drawn the attention of new customers, but they have also attracted unscrupulous persons seeking to defraud others.

One of the more common scams practiced by fraud perpetrators is referred to as "phishing." Phishing involves sending an email to the users of a legitimate online enterprise and directing the users to visit a web site where they are asked to update personal information, such as passwords and/or credit card numbers, social security numbers, and bank account numbers, or any other number that may, or may not, already be on record with the legitimate enterprise. Both the email and the web site to which the user is directed are "spoofed." That is, the email and the web site, commonly referred to as a spoof site, are purposefully designed to look as if they are from, or associated with, the legitimate online enterprise. However, in reality, the purpose of the phishing email is to direct the user to the spoof site, which exists for the sole purpose of stealing the user's personal information, such as the username and password associated with the user's account.

Once a fraud perpetrator has managed to steal the username and password associated with a user's account, the perpetrator will often access the user's account and commit some type of fraudulent activity. For example, if the account is associated with an online financial service provider, such as a bank, the perpetrator may transfer money out of the account and into a different account managed by the perpetrator. If the account is associated with an ecommerce enterprise, for example, such as an auction site, the perpetrator may list items for auction, or sale, and then accept payments for items with no intent of delivering the listed items.

To prevent fraud, many online enterprises attempt to track user activity in an effort to identify when irregular activity occurs. One of the ways that online enterprises attempt to track the activities of their users, including fraud perpetrators, is by tracking and analyzing the Internet Protocol (IP) addresses associated with client requests. However, as illustrated in connection with the network environment 10 shown in FIG. 1, detecting and/or tracking a perpetrator's fraudulent activities poses several challenges. Often, the fraud perpetrator accesses the enterprise server 12 that is hosting the online site from a client device 14 connected to the Internet 16 via an Internet service provider's (ISP) server 18. The ISP server 18 may dynamically assign IP addresses to several computers (e.g., client devices 20, 22, 24, 26, 28 and 30) including the perpetrator's client device 14. Consequently, it may be difficult for the online enterprise server 12 to track the perpetrator's IP address because the IP address may be different each time the perpetrator establishes an online session to access the online enterprise's server 12. Furthermore, the ISP server 18 may act as a proxy for the several client devices 20, 22, 24, 26, 28 and 30, by forwarding requests to the Internet using the ISP server's IP address (e.g., 212.12.12.1) rather than the IP address dynamically assigned to the client device making the request. Accordingly, the online enterprise server 12 may receive an extraordinary number of requests with the same IP address, for example, 212.12.12.1—the IP address of the ISP server 18.

To further complicate matters, in an effort to avoid detection, often a perpetrator will vary the way that he or she accesses the server 12 hosting the web site of a legitimate online enterprise. For example, as illustrated in FIG. 1, a fraud perpetrator using client device 14 may connect to the Internet 14 and access the online enterprise server 12 via any one of three ISP servers (e.g., servers 18, 32 or 34). Accordingly, one person may appear to the enterprise server 12 to be several people. Consequently, the online enterprise server 12 may have a difficult time tracking and detecting the source of fraudulent activity.

SUMMARY

A method and system for identifying a perpetrator of fraudulent activity are provided. A system, according to one embodiment of the invention, may include extraction logic for locating, extracting, or capturing identifying information from a client communication. The system may also include analyzer logic to analyze the identifying information, for example, by comparing it with previously captured identifying information from previous client communications. Finally, the system may include display logic to display a list of user accounts that have an association with a previous client communication in which the same identifying information was used.

BRIEF DESCRIPTION OF THE DRAWINGS

Embodiments of present invention are illustrated by way of example and not limitation in the figures of the accompanying drawings, in which like references indicate similar elements and in which:

FIG. 3 illustrates a header "fingerprint" according to one embodiment of the invention;

DETAILED DESCRIPTION

A method and system for identifying the perpetrator of a fraudulent activity are described. In the following description, for purposes of explanation, numerous specific details are set forth in order to provide a thorough understanding of the present invention. It will be evident, however, to one skilled in the art that the present invention may be practiced without these specific details.

One embodiment of the present invention provides an administrator of an online enterprise with a system for identifying fraud perpetrators. An enterprise server may receive and analyze communications from client applications executing on various client devices. Accordingly, the enterprise server may locate (and optionally extract) identifying information, such as various message headers, from client communications received from the various client devices. If, for example, a client communication relates to a particular user account (e.g., request to login to an account), then the enterprise server may associate the identifying information with that particular user account. Therefore, similar to a fingerprint, the identifying information may be utilized to identify the source of future client communications. For example, in an investigation into fraudulent activity, the identifying information may be compared with previously received identifying information in order to identify a client application, a client device, and/or potentially a person operating the application and device.

Figure 2:
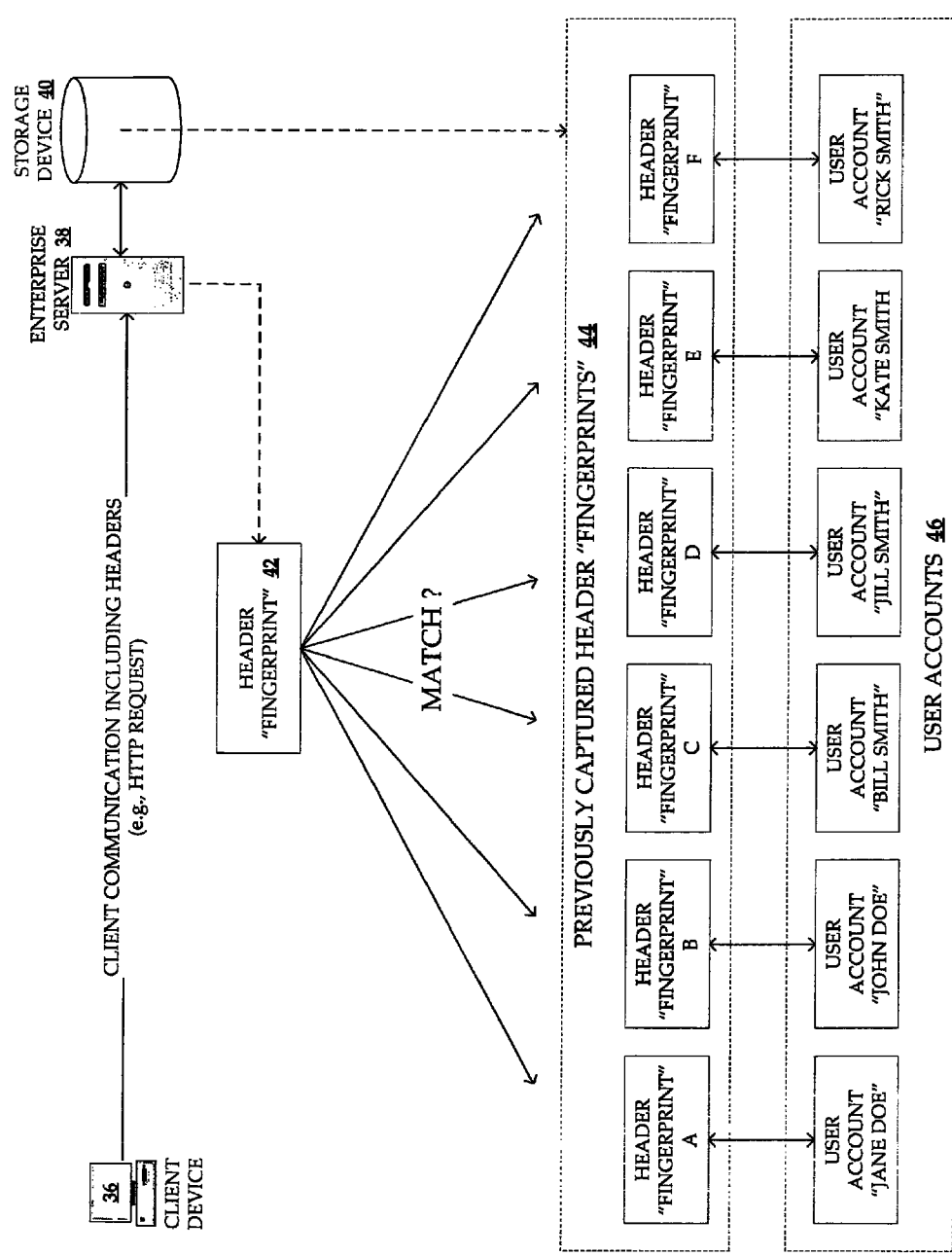
FIG. 2 illustrates a client device and an online enterprise server in communication, according to one embodiment of the invention.

FIG. 2 illustrates a client device 36 in communication with an enterprise server 38, according to one embodiment of the invention. As illustrated in FIG. 2, the client device 36 may be a desktop computer. However, in alternative embodiments of the invention, the client device 36 may be any type of computing device including, but not limited to: a desktop, laptop, notebook, or tablet computer, a mobile phone, and/or a personal digital assistant. In one embodiment of the invention, the client device 36 may execute a client application for requesting and displaying data retrieved from the enterprise server 38. For example, in one embodiment of the invention, the client application may be a standard web browser application, such as Microsoft® Internet Explorer from Microsoft® Corporation of Redmond, Wash.

Similarly, in one embodiment of the invention, the enterprise server 38 may be a standard server computer. However, in alternative embodiments, the enterprise server 38 may be any type of computing device or combination of computing devices. For example, in an embodiment of the invention implemented in a distributed computing environment, the server 38 may include several computing devices connected to a load balancer. The server 38 may execute a wide variety of server applications including, for example, a suite of Internet server applications (e.g., web server, email server, etc.), as well as customized merchant applications and administrative applications and tools.

In one embodiment of the invention, the enterprise server 38 may include, or be connected to, a storage device, such as the storage device 40 illustrated in FIG. 2. The storage device 40 may store a wide variety of data, including data associated with user accounts, such as user profile data and/or username and password data. In addition, in one embodiment of the invention, the storage device 40 may store identifying information extracted from various client communications. For example, the identifying information may include message header data extracted from an HTTP request.

According to one embodiment of the invention, when a client application (e.g., a web browser application) executing on the client device 36 communicates a message to the server 38, the client application may automatically add certain specific information to the message. For example, the communication from the client device 36 to the server 38 may include specific information about the client device 36 and/or the client application, such as an identity and version number for the client application, client application settings (e.g., screen size and/or orientation), operating system information, and a wide variety of other information. In one embodiment, the specific information may be part of, or an extension to, a standardized communication protocol such as, for example, the Hypertext Transfer Protocol (HTTP) as defined by the HTTP/1.1 specification. Accordingly, in an HTTP request, the client application may include one or more request headers (and associated data) in a client communication directed to the server 38. For example, any one or more of the headers included in Table 1 (below) may commonly be included in an HTTP request.

TABLE 1

| HEADER NAME | HEADER DEFINITION |
| --- | --- |
| Accept | The Accept request-header field can be used to specify certain media types which are acceptable for the response |
| Accept-Charset | The Accept-Charset request-header field can be used to indicate what character sets are acceptable for the response |
| Accept-Encoding | The Accept-Encoding request-header field is similar to Accept, but restricts the content-codings that are acceptable in the response. |
| Accept-Language | The Accept-Language request-header field is similar to Accept, but restricts the set of natural languages that are preferred as a response to the request. |
| Authorization | A user agent that wishes to authenticate itself with a server -- usually, but not necessarily, after receiving a 401 response - does so by including an Authorization request-header field with the request. |
| Expect | The Expect request-header field is used to indicate that particular server behaviors are required by the client. |
| From | The From request-header field, if given, SHOULD contain an Internet e-mail address for the human user who controls the requesting user agent. |
| Host | The Host request-header field specifies the Internet host and port number of the resource being requested, as obtained from the original URI given by the user or referring resource. |
| If-Match | The If-Match request-header field is used with a method to make it conditional. |
| If-Modified-Since | The If-Modified-Since request-header field is used with a method to make it conditional: if the requested variant has not been modified since the time specified in this field, an entity will not be returned from the server; instead, a |

TABLE 1-continued

| HEADER NAME | HEADER DEFINITION |
|---|---|
| | 304 (not modified) response will be returned without any message-body. |
| If-None-Match | The If-None-Match request-header field is used with a method to make it conditional. |
| If-Range | If a client has a partial copy of an entity in its cache, and wishes to have an up-to-date copy of the entire entity in its cache, it could use the Range request-header with a conditional GET (using either or both of If-Unmodified-Since and If-Match.) |
| If-Unmodified-Since | The If-Unmodified-Since request-header field is used with a method to make it conditional. |
| Max-Forwards | The Max-Forwards request-header field provides a mechanism with the TRACE and OPTIONS methods to limit the number of proxies or gateways that can forward the request to the next inbound server. |
| Proxy-Authorization | The Proxy-Authorization request-header field allows the client to identify itself (or its user) to a proxy which requires authentication. |
| Range | Since all HTTP entities are represented in HTTP messages as sequences of bytes, the concept of a byte range is meaningful for any HTTP entity. |
| Referer | The Referer[sic] request-header field allows the client to specify, for the server's benefit, the address (URI) of the resource from which the Request-URI was obtained (the "referrer", although the header field is misspelled.) |
| TE | The TE request-header field indicates what extension transfer-codings it is willing to accept in the response and whether or not it is willing to accept trailer fields in a chunked transfer-coding. |
| User-Agent | The User-Agent request-header field contains information about the user agent originating the request. |
| X-Forwarded-For | The X-Forwarded-For field indicates the IP address of the client device, for which a proxy is forwarding a particular request. |

It will be appreciated that there are a wide variety of standard and custom message headers that may be included in a client communication. Although many of the examples presented herein are described in the context of HTTP request headers, example embodiments of the present invention may be implemented to analyze and track a wide variety of standard and custom data fields that are common to client communications, including application level headers (e.g., HTTP headers), network protocol headers (e.g., Internet Protocol (IP) packet headers including IP address), and others. Furthermore, it will be appreciated that in varying embodiments, the invention may be implemented to use any variation or combination of headers as identifying information.

Referring again to FIG. 2, in one example embodiment, the server 38 may receive a client communication from a client application executing on the client device 36. Accordingly, the server 38 may locate, extract, or capture, identifying information associated with the client communication. For example, the server 38 may capture data fields for any number of standard or custom headers included in the client communication. In one embodiment, the headers may be used as a "fingerprint" 42. Next, the server 38 may analyze the identifying information (e.g., the header "fingerprint" 42) associated with the client communication in an attempt to identify the true source of the communication. For example, the server 38 may attempt to identify all user accounts associated with a previous client communication in which the same identifying information was captured.

In one embodiment of the invention, the server 38 may attempt to associate the identifying information with a particular user account. For example, if the header "fingerprint" matches, or nearly matches, one of the many previously captured header "fingerprints" 44 illustrated in FIG. 2, then the enterprise server 38 may identify one of the user accounts 46 associated with the previously captured header "fingerprint."

Furthermore, in one embodiment of the invention, if the client communication includes, or is related to, a request to access data associated with a particular user account, then the server 38 may associate the identifying information (e.g., extracted message headers) with that particular user account. Accordingly, the server 38 may compare the header information of a future client request associated with that particular user account to determine whether the header information is the same. If, for example, a future client request includes header information that varies significantly from the previously received header data, the server 38 may flag the account for potential unauthorized access. In one embodiment, the server 38 may automatically notify or alert an administrator (e.g., via email) of the potential unauthorized access. Alternatively, the server 38 may simply make note of the header data discrepancy by, for example, setting a variable associated with the user's account to indicate that header information varies from user session to session. In addition, the server 38 may associate the new message header data with the user account and store the header data in a storage device 40.

Figure 1:
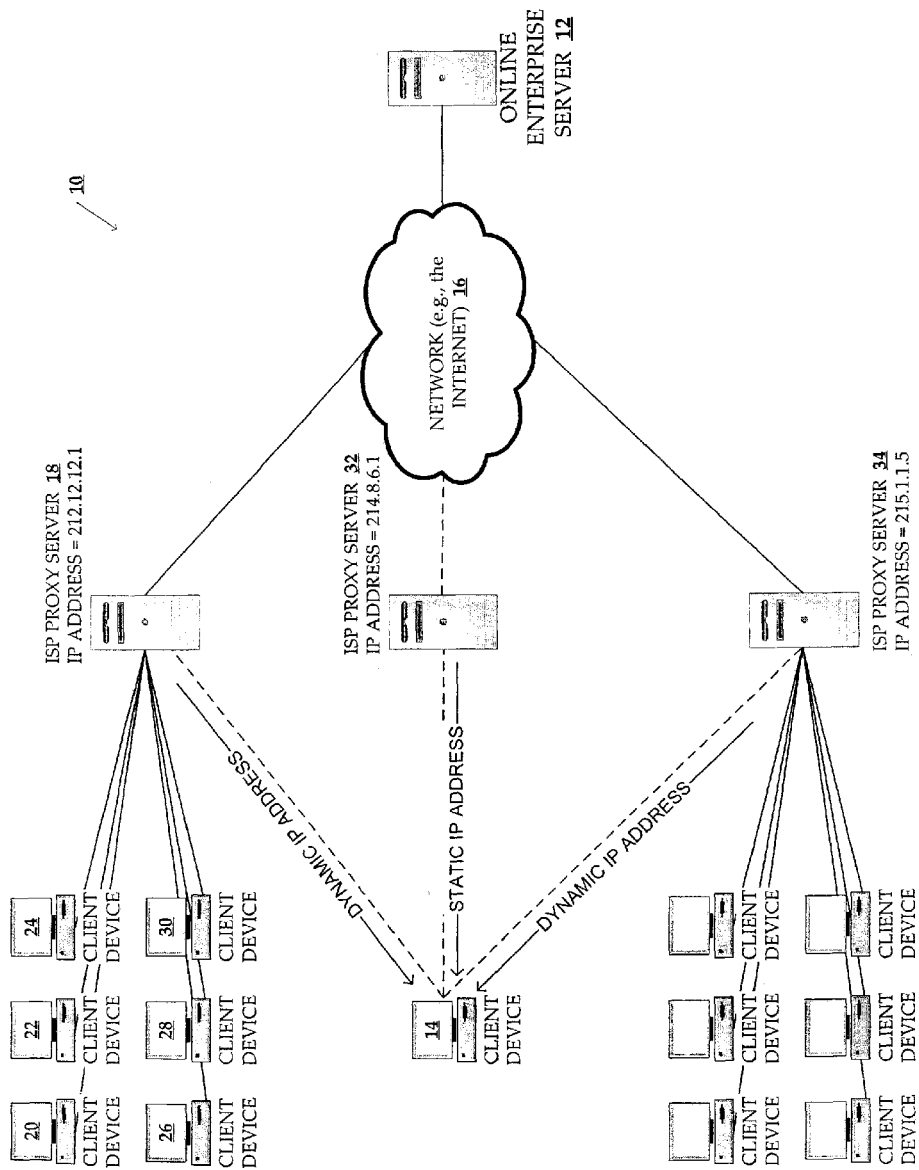
FIG. 1 illustrates a network environment including a client device having several network connections to a server of an online enterprise.

FIG. 3 illustrates an example of a header "fingerprint" 42 according to one embodiment of the invention. As illustrated in FIG. 3, the header "fingerprint" includes several headers and corresponding data. Many of the headers included in FIG. 3 are HTTP request headers. In one embodiment, the IP address of the client device that initiated the HTTP request may also be included in the header "fingerprint." For example, the IP address of the client initiating a request may be included in a header field, such as the "X-Forwarded-For" header, sometimes referred to simply as the "Forwarded-For" header. In some cases, an ISP proxy server (e.g., servers 18, 32 and 34 in FIG. 1) may add the client IP address to the "Forwarded-For" header when a message is forwarded from a proxy to a server. Accordingly, if the "Forwarded-For" header field includes an IP address, it may also be used as part of the header "fingerprint."

It will be appreciated that the possibility exists that many client devices will use the same, or similar, headers. Accordingly, unlike fingerprints, a group of message headers may or may not uniquely identify a single client device, and by association, an individual. However, during an investigation into fraudulent activities, depending on the number and mix of message headers used in a header "fingerprint," an enterprise may be able to significantly reduce the pool of potential users that match a particular header "fingerprint." In one embodiment of the invention, once a pool of users has been identified as potential perpetrators, further analysis may be performed in an effort to identify the perpetrator of a particular fraudulent act.

Figure 4:
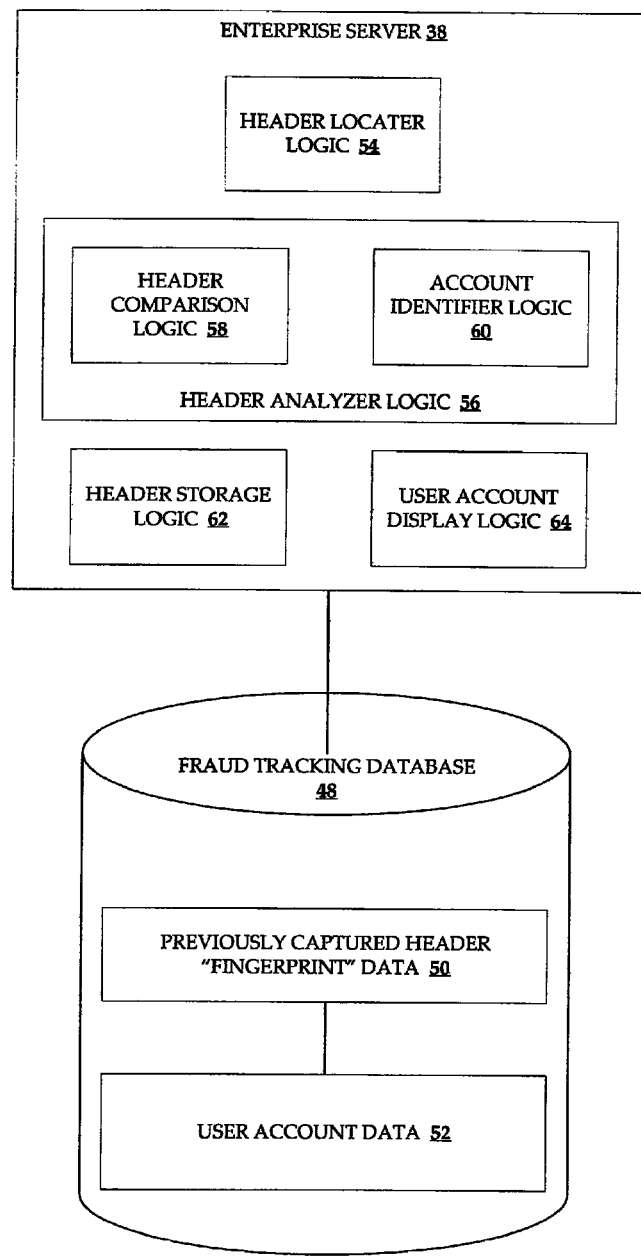
FIG. 4 illustrates a system, including the various functional components for identifying a fraud perpetrator, according to one embodiment of the invention.

FIG. 4 illustrates a server 38, including the various functional components for identifying a fraud perpetrator, according to one example embodiment of the invention. The server 38 may include a wide variety of functional components in addition to those shown, for example, such as one or more Internet server applications (e.g., a web server). However, to avoid obscuring the invention, only those functional components pertinent to the invention have been shown in the example server 38 illustrated in FIG. 3.

The server 38 may include, or be connected to, a fraud tracking database 48. The fraud tracking database may include previously captured identifying information, such as message headers from client communications 50. Furthermore, in one embodiment, the fraud tracking database may include user account data 52. For example, the user account data may include a username associated with an account and linked by association to one or more previously captured header "fingerprints" 44.

In addition, the server 38 may include location (or extraction) logic 54 for locating, extracting, or capturing, identifying information (e.g., HTTP request headers) from communications received from client devices. The server 38 may also include analyzer logic 56 for analyzing the extracted identifying information. For example, in one embodiment, the analyzer logic 56 may include comparison logic for comparing the identifying information extracted from a client communication to previously captured identifying information associated with one or more user accounts. Accordingly, the analyzer logic 56 may also include account identifier logic for identifying user accounts associated with a previous client communication in which the same identifying information was extracted.

The server 38 may include storage logic 62 for storing identifying information. For example, in one embodiment, each time the server 38 extracts identifying information and is able to determine an association between the identifying information and a particular user account, the storage logic 62 may associate the identifying information with the particular user account and store the identifying information.

The server 38 may include a search tool, including a user interface and search logic (not shown), that facilitates searching for user accounts that may be associated with particular identifying information captured during a particular transaction. For example, if the server 38 captures identifying information during a transaction that is later identified as fraudulent, then the identifying information may be used in a search to identify previous communications, and associated user accounts, that utilized the same identifying information. In one embodiment, the search tool may include logic to facilitate a standing query. For example, the server 38 may continue to compare identifying information, including HTTP request headers, received during future client communications in an attempt to match the identifying information with identifying information received during a transaction known to be fraudulent.

Figure 5:
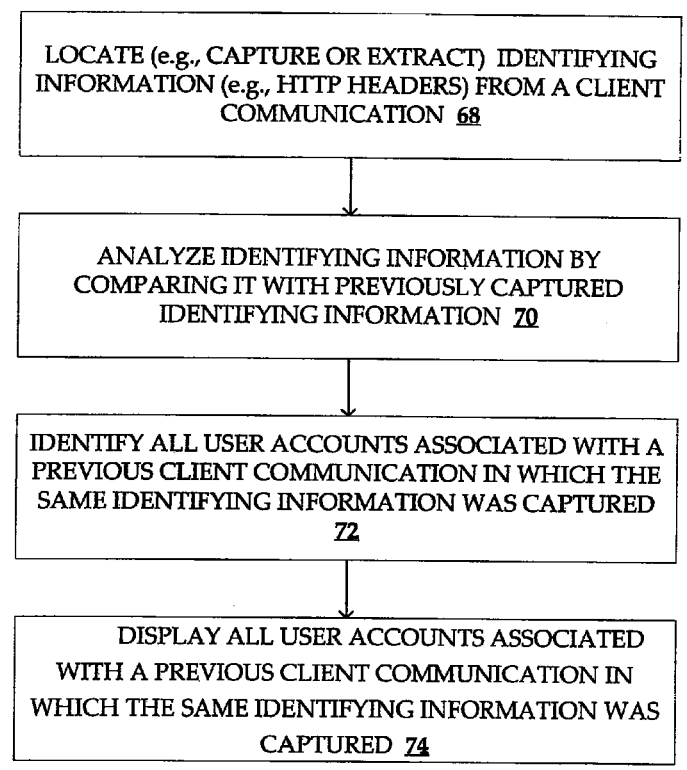
FIG. 5 illustrates a method, according to one embodiment of the invention, for identifying perpetrators of fraudulent activities.

FIG. 5 illustrates a method 66, according to one example embodiment of the invention, for identifying perpetrators of fraudulent activities. As illustrated in FIG. 5, the method 66 begins at operation 68 by locating, capturing, and/or extracting identifying information from a client communication. Next, at operation 70, the identifying information captured in operation 68 is analyzed. For example, in one embodiment of the invention, the identifying information is compared with identifying information previously captured in one or more previous client communications. At operation 75, multiple (e.g., all) user accounts associated with a previous client communication in which the same identifying information was captured are identified. Finally, at operation 74, all user accounts associated with a previous client communication in which the same identifying information was captured are displayed. In one embodiment, one or more accounts may be flagged for further review. For example, the server 38 may make the administrator aware of the accounts, so the administrator can take a closer look at the activity associated with the account.

Figure 6:
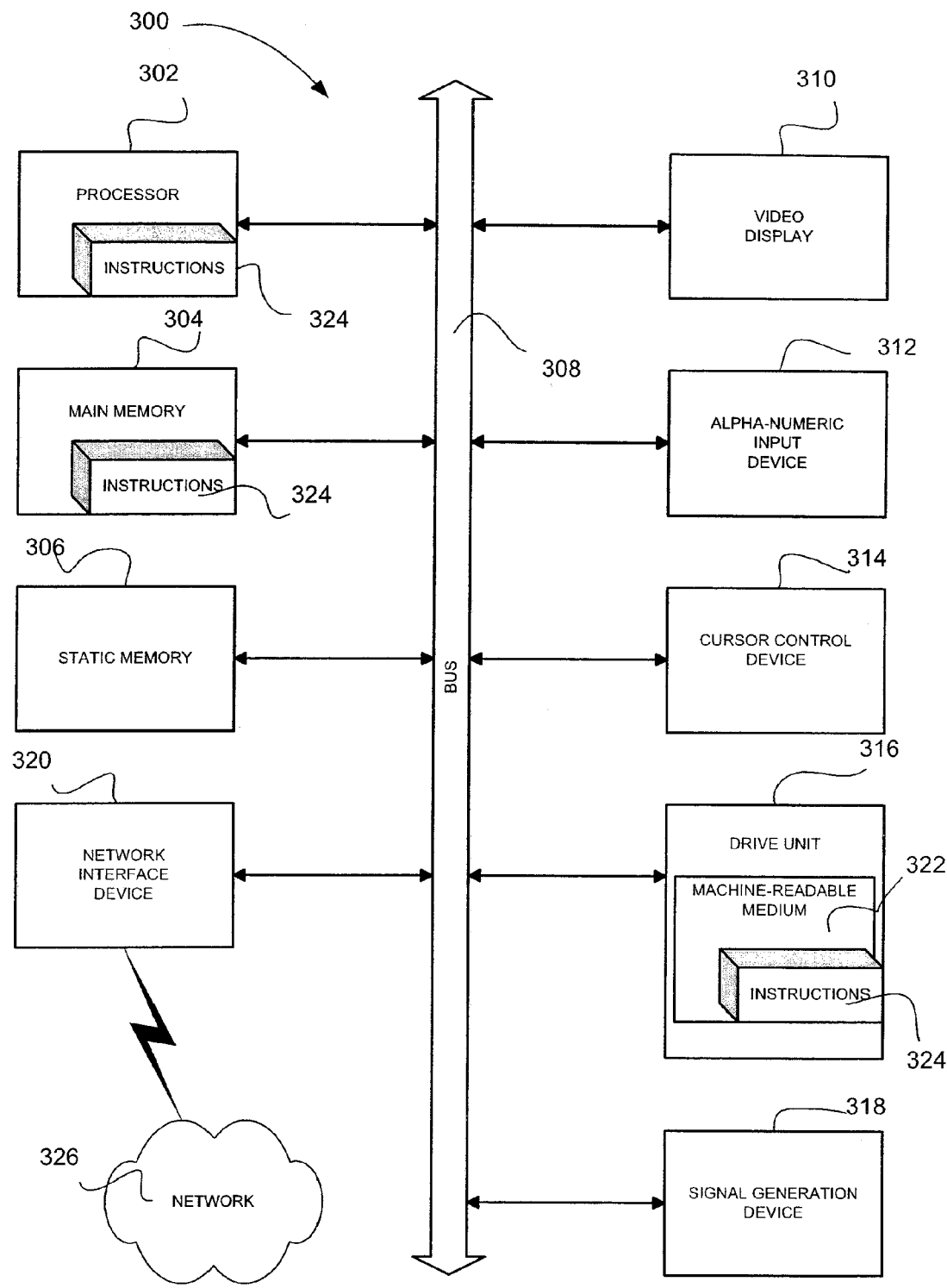
FIG. 6 illustrates a server, according to one embodiment of the invention, for identifying perpetrators of fraudulent activities.

FIG. 6 shows a diagrammatic representation of a machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical media and magnetic media.

Thus, a method and system for identifying fraudulent activities and the perpetrators of such activities have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for identifying fraudulent activity, the method comprising:
- receiving and extracting, at a server comprising at least one hardware-based processor and a memory coupled to the at least one hardware-based processor, header information from each of a plurality of client communications issued by one or more client devices;
- identifying an account associated with each of the plurality of client communications;
- analyzing the header information of each of the plurality of client communications received from the one or more client devices to identify variations between the header information from different ones of the client communications;
- comparing the header information of each of the plurality of client communications with a respective one of a previous client communication in which the same identifying information was used in a prior header;
- based on a determination that at least portions of the header information of at least one of the plurality of client communications is dissimilar from the same portion of header information in a respective one of a previous client communication, identifying the client communications as comprising a fraudulent activity; and
- causing display of a list of user accounts that have an association with a previous client communication in which the same identifying information was used.

2. The method of claim 1, wherein the header information comprises hypertext transport protocol (HTTP) and the client communications are HTTP requests.

3. The method of claim 1, further comprising storing the header information of the client communications in a storage device.

4. The method of claim 1, wherein the analyzing further comprises making a determination as to whether there is a similarity of the client communications and at least one previous communications associated with the account.

5. The method of claim 4, further comprising flagging the user account in an accounts database for potential unauthorized access if the similarity between the client communications and the at least one previous communications associated with the account is less than a predefined threshold level.

6. The method of claim 1, further comprising generating a plurality of client communications fingerprints, each of the plurality client communications fingerprints being based on field values contained within associated ones of each of the client communications.

7. The method of claim 6, further comprising storing the plurality of client communications fingerprints for later comparison with header information extracted from subsequent client communications.

8. A system to identify a perpetrator of a fraudulent activity, the system comprising:
- an extraction module having one or more hardware-based processors to extract identifying information from headers in a plurality of client communications received from one or more client devices;
- an identification module to identify an account associated with each of the plurality of client communications;
- an analyzer module to analyze the header information of each of the plurality of client communications received from the one or more client devices to identify variations between the header information from different ones of the client communications, the analyzer module further to compare the header information of each of the plurality of client communications with a respective one of a previous client communication in which the same identifying information was used in a prior header, and based on a determination that at least portions of the header information of at least one of the plurality of client communications is dissimilar from the same portion of header information in a respective one of a previous client communication, identify the client communications as comprising a fraudulent activity; and
- a display module that causes display of a list of user accounts that have an association with a previous client communication in which the same identifying information was used.

9. The system of claim 8, wherein the analyzer module is further to analyze the identifying information by comparing the identifying information with previously extracted identifying information from a plurality of previously-received client communications.

10. The system of claim 8, further comprising a storage device including an accounts database to store information related to each of a plurality of user accounts.

11. The system of claim 8, wherein the analyzer module is further to make a determination as to whether there is a similarity of the client communications and at least one previous communications associated with the account.

12. The system of claim 11, further comprising a comparison logic module to flag the user account in an accounts database for potential unauthorized access if the similarity between the client communications and the at least one previous communications associated with the account is less than a predefined threshold level.

13. The system of claim 8, wherein the analyzer module is further to generate a plurality of client communications fingerprints, each of the plurality client communications fingerprints being based on field values contained within associated ones of each of the client communications.

14. The system of claim 13, further comprising storing the plurality of client communications fingerprints for later comparison with header information extracted from subsequent client communications.

15. A computer-related medium having no transitory signals and storing instructions that, when executed by at least one hardware-based processor, perform operations to identify fraudulent activity, the operations comprising:
- receiving and extracting, at a server comprising at least one hardware-based processor and a memory coupled to the at least one hardware-based processor, header information from each of a plurality of client communications issued by one or more client devices;
- identifying an account associated with each of the plurality of client communications;
- analyzing the header information of each of the plurality of client communications received from the one or more client devices to identify variations between the header information from different ones of the client communications;
- comparing the header information of each of the plurality of client communications with a respective one of a previous client communication in which the same identifying information was used in a prior header;

based on a determination that at least portions of the header information of at least one of the plurality of client communications is dissimilar from the same portion of header information in a respective one of a previous client communication, identifying the client communications as comprising a fraudulent activity; and causing display of a list of user accounts that have an association with a previous client communication in which the same identifying information was used.

16. The computer-related medium of claim 15, wherein the analyzing further comprises making a determination as to whether there is a similarity of the client communications and at least one previous communications associated with the account.

17. The computer-related medium of claim 16, further comprising flagging the user account in an accounts database for potential unauthorized access if the similarity between the client communications and the at least one previous communications associated with the account is less than a predefined threshold level.

18. The computer-related medium of claim 15, further comprising generating a plurality of client communications fingerprints, each of the plurality client communications fingerprints being based on field values contained within associated ones of each of the client communications.

19. The computer-related medium of claim 18, further comprising storing the plurality of client communications fingerprints for later comparison with header information extracted from subsequent client communications.

\* \* \* \* \*